US010054452B2

(12) United States Patent
Jaquinta et al.

(10) Patent No.: US 10,054,452 B2
(45) Date of Patent: Aug. 21, 2018

(54) PERSONALIZED OPTIMAL TRAVEL ROUTE PLANNING

(71) Applicant: International Business Machines Corporation, Armonk, NY (US)

(72) Inventors: Joseph M. Jaquinta, Winchester, MA (US); Shane M. Kilmon, Tyngsborough, MA (US); Craig R. Wolpert, Holliston, MA (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 14/939,343

(22) Filed: Nov. 12, 2015

(65) Prior Publication Data

US 2017/0138744 A1 May 18, 2017

(51) Int. Cl.
*G01C 21/34* (2006.01)

(52) U.S. Cl.
CPC ..... *G01C 21/3415* (2013.01); *G01C 21/3484* (2013.01)

(58) Field of Classification Search
CPC . G01C 21/34; G01C 21/3415; G01C 21/3446
See application file for complete search history.

(56) References Cited

U.S. PATENT DOCUMENTS

| 7,680,595 B2 | 3/2010 | Brinton et al. |
| 2006/0136128 A1 | 6/2006 | Chen |
| 2006/0149461 A1 | 7/2006 | Rowley et al. |
| 2007/0118284 A1 | 5/2007 | Sposato et al. |
| 2007/0179709 A1* | 8/2007 | Doyle ............... G01C 21/3453 701/417 |
| 2009/0164115 A1 | 6/2009 | Kosakowski et al. |
| 2013/0304382 A1 | 11/2013 | Nomoto et al. |
| 2014/0156188 A1 | 6/2014 | Hart et al. |
| 2014/0278056 A1 | 9/2014 | Williams et al. |

FOREIGN PATENT DOCUMENTS

| GB | 2416870 A | 2/2006 |
| WO | 2011059421 A1 | 5/2011 |
| WO | 2012086137 A1 | 6/2012 |

OTHER PUBLICATIONS

"Updating Routes with Real-Time Data", Telogis Dev, Published, Feb. 6, 2013, 22:59, pp. 1-8, <http://dev.telogis.com/resources/view/updating-routes-with-real-time-data>.

* cited by examiner

*Primary Examiner* — Basil T. Jos
(74) *Attorney, Agent, or Firm* — Andrew Aubert (57) ABSTRACT

Personalizing travel route planning based on past actual user travel behavior and reasons that the user deviated from planned routings. The route planning algorithm is revised based on analysis of user input related to a deviation from a planned routing. If a new trip in the planning stage entails considerations similar to those that caused the user's deviation on a previous trip, then the revised route planning algorithm can take these considerations into account when planning the route for the new trip. Changes in route planning may apply when the user: (i) plans to make a trip similar to a previous trip when the deviation occurred; (ii) plans to make a different trip, but the trip entails considerations that lead to the deviation on the prior trip; (iii) is using the same vehicle as for the previous trip with the deviation; and/or (iv) is using a different vehicle.

12 Claims, 4 Drawing Sheets

PERSONALIZED OPTIMAL TRAVEL ROUTE PLANNING

BACKGROUND

The present invention relates generally to the field of travel route planning, and more particularly to route planning that makes use of global positioning system (GPS) information.

Conventional software working in conjunction with global positioning system (GPS) data can provide recommended directions (or "travel route") between a starting location and a destination, in real time, and in some cases, while a traveler is en route. Software contains logic which recommends a "best" route (based on relevant travel factors) and might also provide alternative routes. If the traveler deviates from a recommended route, the software recalculates and provides an updated "best route" starting from the traveler's current location. Typically, users can also create special purpose "trips," such as a scenic trip, or a trip based on mileage (for a bicycle rider, for example) when the "best route," as conventionally determined, is less important.

GPS-related software typically provides an ability to recalculate when a wrong turn is made.

SUMMARY

According to an aspect of the present invention, there is a method, computer program product and/or system that performs the following operations (not necessarily in the following order): (i) generating, by a machine logic implemented routing algorithm, a first planned routing for a first trip to be undertaken by a first vehicle controlled by a user; (ii) receiving, through a positioning system, positioning input data corresponding to locations of the vehicle during the first trip; (iii) determining, by machine logic and based on the positioning input data, that the vehicle has made a first deviation from the planned routing; (iv) receiving, from the user, user input about the user's reason(s) for making the first deviation; (v) revising, based, at least in part, upon the user input, the machine logic implemented routing algorithm to form a first revised routing algorithm; and (vi) generating, by the first revised routing algorithm, a second planned routing for a second trip to be undertaken by a second vehicle controlled by a user, with the second planned routing being different than a planned routing for the second trip that would be obtained if the machine logic implemented routing algorithm had been used to generate a planned routing for the second trip.

DETAILED DESCRIPTION

A method for personalizing travel route planning based on past actual user travel behavior and reasons that the user deviated from planned routings. Information provided by the user, and related to a deviation from a planned routing, is analyzed to make revisions (for example, add machine logic based rules to) to the route planning algorithm. This was, if a new trip in the planning stage entails considerations similar to those that caused the user's deviation on a previous trip, then the revised route planning algorithm can take these considerations into account when planning the route for the newly-planned trip. The changes in route planning caused by the revisions to the algorithm that were based upon the user's reasons for deviation may apply to: (i) an occasion where the user plans to make the same trip (that is, substantially the same beginning and ending locations) as the previous trip with the deviation occurred; (ii) an occasion where a user plans to make a different trip, but the trip entails considerations that lead to the deviation on the prior trip; (iii) an occasion where the user is using the same vehicle as she did when she made the previous trip with the deviation; and/or (iv) the user is using a different vehicle.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
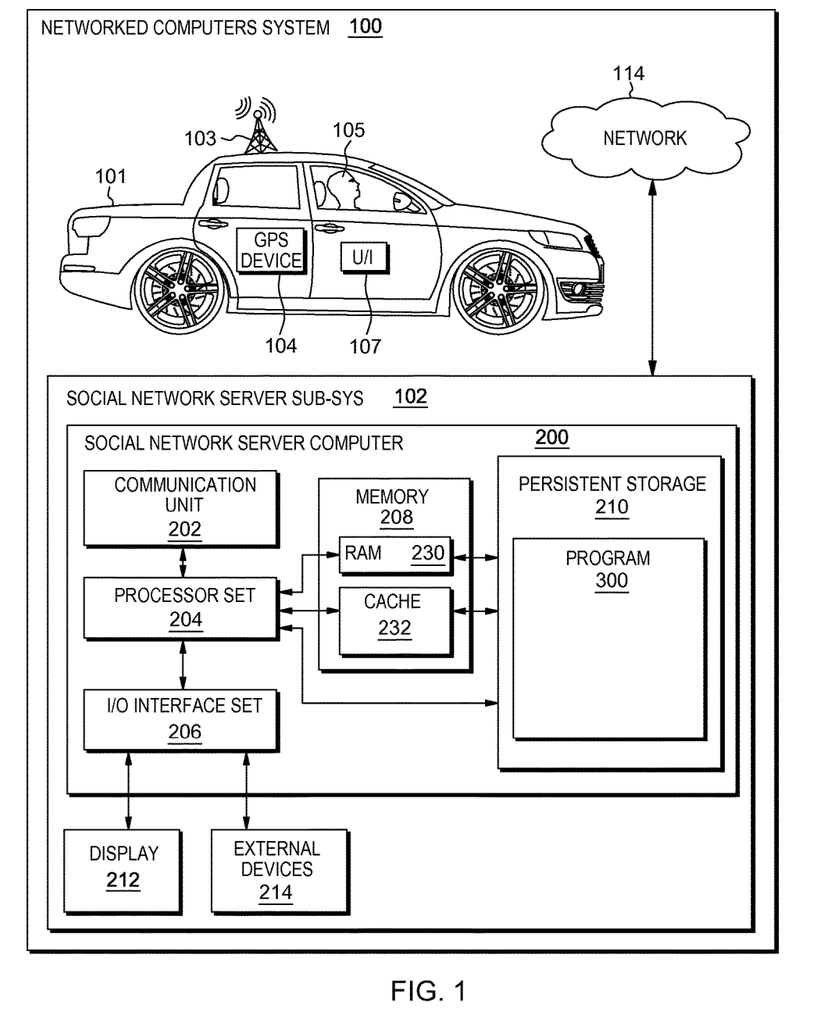
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: vehicle 101; social network server subsystem 102; wireless transceiver 103; GPS device 104; user 105 (also referred to as traveler 105); user interface (U/I) 107; communication network 114; social network server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with route optimizing server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
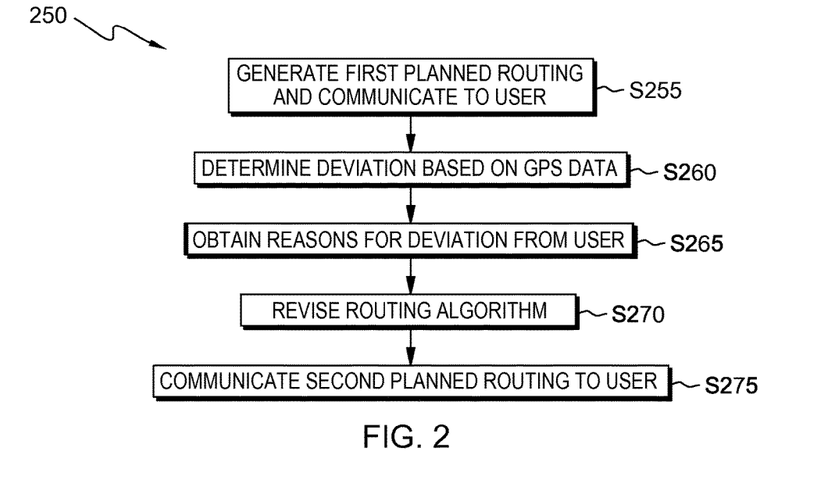
FIG. 2 is a flowchart showing a first embodiment method performed, at least in part, by the first embodiment system.
Figure 3:
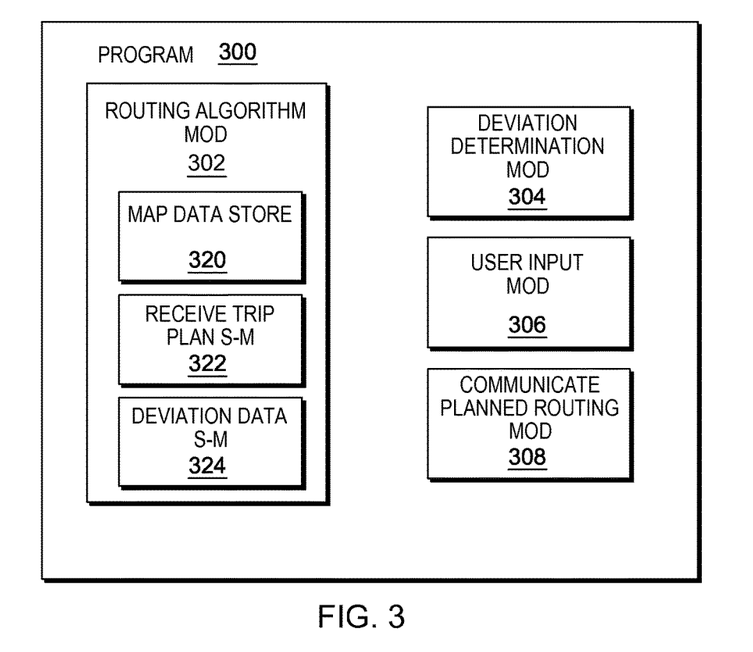
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where receive trip plan sub-module 322 of routing algorithm module 302 receives information relating to a trip that user 105 (see FIG. 1) plans to take using vehicle 101. In this embodiment, this information includes beginning location of the trip, end location of the trip and estimated departure time. In this embodiment, user 105 sends this information through user interface 107 of the user's device. In this embodiment, the U/I 107 is provided as a service by a social networking media site which is implemented and made available to registered users by social networking server sub-system 102. Alternatively, these trip planning services could be provided in other ways, such as by other types of internet sites, as an application in user's mobile device (that is, the mobile device that provides the hardware for user interface 107), as a program built into a standalone GPS unit (or other car mounted computer) in vehicle 101, or any other way now known or to be developed in the future. In this embodiment, the user sends the information wirelessly through vehicle mounted wireless transceiver 103 to network 114, and thence to sub-system 102. Alternatively, user 105 could plan his trip from some other location, such as his home computer.

In this embodiment, the user is a single individual human, but, see definition of "user," below in the Definitions subsection of this Detailed Description section. In this embodiment, the vehicle is a motor vehicle designed for use on paved roads, but, alternatively, the vehicle could be any type of vehicle (now known or to be developed in the future) for which travel routes may be planned. It is noted that, for purposes of this document, a pedestrian's walking legs are considered as a form of "vehicle." While a given vehicle, operated in conjunction with this embodiment of the present disclosure, may be driverless, the vehicle is controlled by the user (who may or may not be human). Alternatively, vehicle 101 may be a motor vehicle for ground travel driven by a human driver who is in the vehicle, a vehicle driven by a human driver who is remote from the vehicle, a driverless motor vehicle controlled by machine logic, an aircraft, a watercraft, a human powered vehicle or a pedestrian.

Further at operation S255, routing algorithm module ("mod") 302 generates a first travel plan (sometimes herein referred to as the "planned route"), based on the following: (i) the user's trip information; (ii) information included in map data store 320; and (iii) a set of machine logic based rules used to generate route plans (herein called the route planning algorithm). At the time of operation S255, this set of machine logic based rules, in this embodiment, is a conventional algorithm of the type that already exists for route planning. The route generated at S255 is a conventional route, and is the same route that would be generated using currently conventional route planning software. However, it is noted that this algorithm will be revised in later operations, to be discussed below, so that it is not the same as currently conventional route planning algorithms. As mentioned above, in this embodiment, route planning algorithm of routing algorithm mod 302 is provided and maintained by a social networking site. Alternatively, it need not be, and may be administered, controlled and/or maintained by other types of entities.

Further at step S255, communicate planned routing mod 308 communicates the first travel plan to user 105 (see FIG. 1) through network 114, wireless transceiver 103 and to U/I 107 of the user's mobile device. In this embodiment, the planned route is communicated in human understandable form, specifically as a prominent path line superimposed on a scalable and scrollable map.

Processing proceeds to operation S260, where deviation determination module 304, of program 300, receives "location information" indicating the actual travel route taken by vehicle 101 (see FIG. 1) in order to get from the start location to the end location of the trip. More specifically, as the trip is in progress, GPS device 104 sends location information for vehicle 101 through wireless transceiver 103 and network 114 to deviation determination mod 304. When the trip is completed, mod 304 determines that the route taken by vehicle 101 did not match the planned route, which means that there was a "deviation." In this example, only one deviation was made. Alternatively, a single trip may be subject to multiple discrete deviations. In this embodiment, deviation determination module 304 receives real-time global positioning system (GPS) information from GPS device 104 (see FIG. 1) that accompanied the user during travel. Alternatively, other potential location information sources include: (i) WiFi hotspots that detect and establish the proximal presence of one or more of the traveler's electronic devices; (ii) cell phone system(s) that identify cellphones within their detection range(s); (iii) automobile wireless and/or satellite enabled systems; (iv) wearable and/or embedded subcutaneous electronics; and/or (v) social media information from social network server computer 200 of FIG. 1.

Processing proceeds to operation S265 where user input module 306, of program 300, queries user 105 and receives responsive user input including information pertaining to reasons why the user 105 deviated from the route that was planned in operation S255. Similar to the user communications discussed above in connection with operation S255, the communications go through U/I 107, wireless transceiver 103 and network 114. In this embodiment, these communications are delivered to a social networking service, of which user 105 is a registered member, which helps the user feel secure in sharing the user input related to reason(s) for the deviation. Some possible types of reason for deviations include the following: (i) commercial; (ii) aesthetic; (iii) road condition; (iv) weather condition; (v) mechanical problem; (vi) personal need; (vii) change of intermediate waypoint; (viii) illness; (ix) emergency event; (x) mandatory detour; and (xi) law enforcement action. In this embodiment, the reasons for deviation are stored in deviation data store 324 so that other drivers who make similar deviations in the future can be offered these reasons as possibilities when explaining the reasons for their deviations.

Processing proceeds to operation S270, where routing algorithm module 302 revises, based upon the user input received at operation S265, the machine logic implemented routing algorithm to form a first revised routing algorithm. This revised algorithm will generally be largely the same as the unrevised version, but is revised, at least somewhat, based on the user input.

A simple example of a revision will now be set forth to help the reader understand what kind of revisions may be made. Assume that the original algorithm had a machine logic based route to the following effect: Choose the shortest route as the planned route. However, the user makes a deviation from a planned route and explains the deviation as follows: "I enjoy looking at the changing leaves." Accordingly, the revised algorithm is revised to include two machine logic based rules as follows: (i) except during daylight hours in the month of October, choose the shortest route as the planned route; and (ii) during daylight hours in the month of October, choose the most scenic route as the planned route. Because this embodiment collects reasons for deviations on a user-specific basis, the planned routes by the revised (or re-revised or re-re-revised and so on) algorithm of mod 302 will be well-tailored to the user, even if they would be unacceptable to other users.

When the algorithm is revised by changing its machine logic based rules these changes may take the form of a set of add-on rules that may supersede results obtained with a general route planning algorithm used as a starting point in this example at operation S255. Alternatively, the revisions to the rules could be integrated into the original rules themselves.

Processing proceeds to operation S275 where: (i) receive trip plan sub-mod 322 receives information corresponding to another planned trip (the "second trip") of user 105; (ii) the revised route planning algorithm of mod 302 generates a planned route for the second trip (the "second travel routing plan"); and (iii) communicate planned routing module 308 communicates the second travel routing plan to user 105. The second trip may be taken by user 105 in a different vehicle, other than vehicle 101. In this example: (i) the beginning and end locations of the first and second trips are the same; and (ii) the same vehicle is being driven for the first and second trips. In this example, the second planned route is different than the first planned route, despite the common beginning and ending locations as between the two trips. This is because of the revisions to the algorithm discussed, above, in connection with operation S270.

In this example, the second planned route is communicated along with the user input that caused the revisions to the rules that caused the second planned route to be different than what it would be if user 105 had used a generic route planning software, not tailored to his preferences as gleaned from his reasons for his deviation on the previous trip. By receiving this user input, it may help user 105 of the reasons why the second planned route is likely to correspond with his preferences. For example, if his reason for a previous deviation was to look at the changing leaves, then seeing this user input he previously gave may help him to realize that the second planned route is indeed preferable to him over a shorter route, or help him to remember to bring his best camera along on the trip, etc. Other types of "explanatory information" are also possible. As an alternative example, the explanatory information could simply be the word "SCENIC," without going into the fuller explanation about the autumn leaves.

As a further alternative, at operation S275, the second planned route could be presented along with other possible routes, such as the route that would be obtained without the revisions to the algorithm made in response to the deviation and user input explaining that.

III. FURTHER COMMENTS AND/OR EMBODIMENTS

Some embodiments of the present invention may include one, or more, of the following features, characteristics and/or advantages: (i) GPS-related software that learns or adapts to a traveler's preferences; (ii) software that learns or adapts to prevent situations where a traveler is directed on a path which may not be preferred and the traveler may have to remember where to diverge from the GPS's directions; (iii) avoids, or reduces, need to creating a custom route using a GPS dashboard (also known as a user interface); and/or (iv) avoids, or reduces, need for a traveler to recreate a preferred route "on-the-fly" when it is desired to deviate from a "best route" that the GPS-related software is recommending.

Some embodiments of the present invention provide a technique to base route recommendations on certain user preferences. A preferred route might take into consideration, for example, of a street being familiar, fewer traffic lights or easier intersections to cross and bypass, rather than traditional factors such as the shortest or fastest route, or on an attribute such as scenic qualities, travel time or mileage.

Some embodiments of the present invention may include one, or more, of the following features, characteristics and/or advantages: (i) leverages a "post-travel follow-up" approach where the GPS software contacts a user after a trip is complete to list route segments where the user diverged from the recommended route; (ii) presents the list in a timely manner while the trip is still fresh in the user's mind and the user is still familiar with the deviations taken and the associated reasons; (iii) presents the user with options to accept or reject each deviation; (iv) promotes some or all of the deviations to the user's personal preferences; (v) modifies future GPS recommendations, based on the user's personal preferences, to create a new "best" route; and/or (vi) the new "best" route is then used when the same start and destination locations are selected, or detected by the GPS software when included in a longer path.

Some embodiments of the present invention introduce a social aspect to the operating concept, wherein the post-travel follow-up asks for details about each trip modification or deviation. Options include a multiple choice survey listing questions related to aspects of the user's preferences, such as: (i) traffic; (ii) street familiarity; (iii) ease of travel; and/or (iv) scenic qualities, etc. In some embodiments, user feedback is analyzed for similarities with feedback from other users or (with the user's approval) automatically published for others to comment on.

Some embodiments of the present invention allow free-format user feedback. Free-format feedback is useful when sharing information with other users because each person can evaluate others' feedback and determine whether the reasons for a route deviation are relevant to themselves and/or should be applied to their own route.

Some embodiments of the present invention may include one, or more, of the following features, characteristics and/or advantages: (i) a user's personal preferences are factors that are considered in formulating a "better route" for the user; (ii) a user's personal preferences contribute to improving directions for other users; (iii) a route deviation can become a new standard; (iv) users share their preferences with other users; (v) users find route improvements from a shared catalog; (vi) the shared catalog lists categorized alternatives; (vii) the shared catalog includes free-format feedback; and/or (viii) a "best route" is a technique to track and prioritize a user's preference over other valid alternatives.

Some embodiments of the present invention apply personal preferences to optimize a route for a user, by for example: (i) following a "better" route (where "better" is defined by the user); (ii) bypassing a "difficult" intersection (where "difficult" is defined by the user); and/or (iii) considering factors such as (a) avoiding particular roads during high-traffic periods, (b) avoiding certain places at times when there is excessive solar glare, (c) avoiding places that are known for difficult travel during inclement weather conditions, (d) avoiding poorly maintained roadways, (e) avoiding roads under construction, detouring around temporary traffic congestion, etc.

In some embodiments of the present invention, a traveler uses a GPS dashboard (also known as a user interface) to algorithmically create, plan and save a trip. Some embodiments utilize software to apply a "post-travel follow-up" approach and compare the saved trip with the route created by the software (post-travel follow-up) and then ask the user for feedback to explain diversions from the algorithmically created route.

Some embodiments of the present invention: (i) leverage an existing GPS device and software to provide navigation for a traveler; (ii) register the GPS device with server software allowing the GPS device to upload an approved route plan (also referred to as the planned route or the recommended route) and any route changes (deviations) made during a trip; (iii) upload the deviations in real time (for example, at specified intervals), or after a trip is complete; and/or (iv) compare the two paths (planned route versus the actual route).

With regard to item (iv) above, working backwards from the start and destination, some embodiments of the present invention determine the minimum route segment for which the traveler deviated from the approved route plan. The deviation is further examined, and if there is a segment of the route where the traveler resumed the planned route (for more than a trivial amount, such as intersecting the same road) then deviated again, then the deviation segment is broken into two segments and the process started over with each segment being considered a separate approved and actual route pair and the result is a segment having the same starting and ending points, but with one route calculated by the software (a recommended route), and the other one chosen by the traveler (an actual route). If a planned route (or segment) and an actual route (or segment) do not have the same starting and ending points, then the route (or segment) is not considered for analysis.

Figure 4:
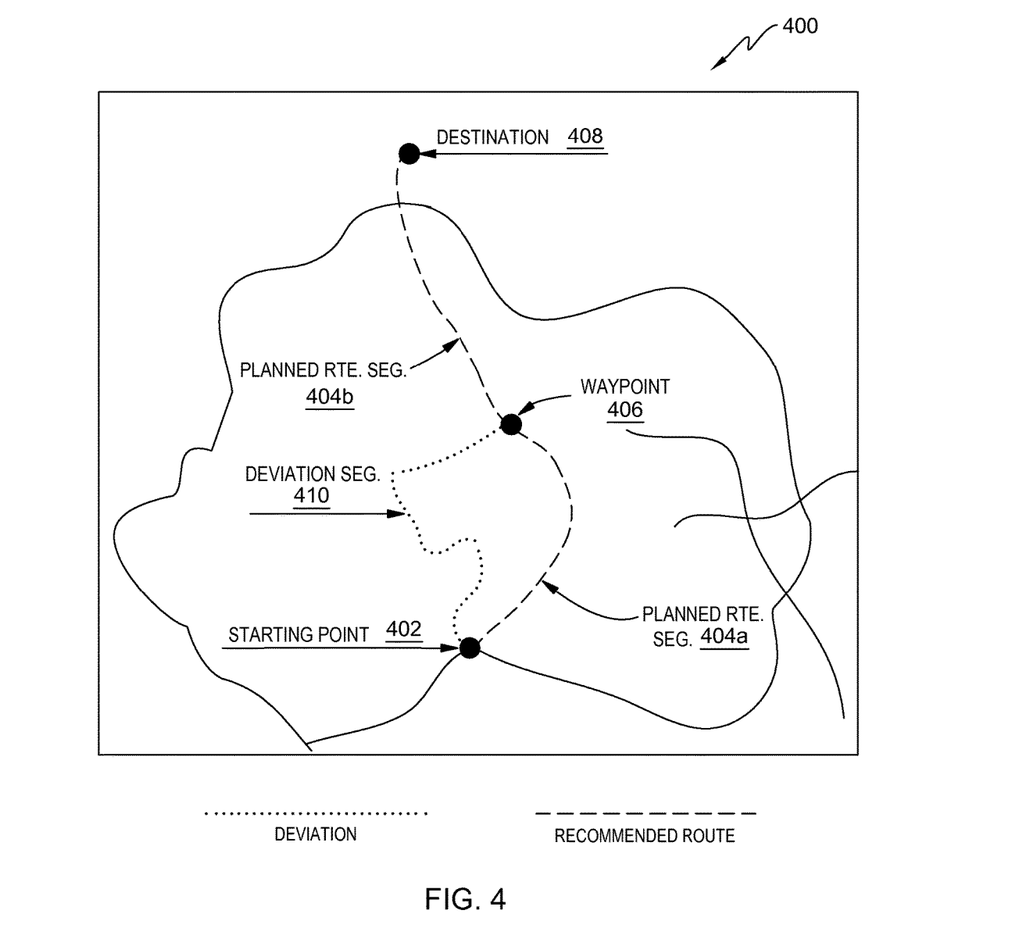
FIG. 4 is a screenshot of a map showing information that is helpful in understanding aspects of the first embodiment system.

As shown in FIG. 4, example map 400 shows a planned trip (as recommended by GPS software) in one embodiment of the present invention, including: starting point 402;

planned route segments 404a and 404b; waypoint 406; destination 408; and deviation segment 410. The route, as planned by the GPS software includes planned route segments 404a and 404b. Planned route segment 404a extends from starting point 402 to waypoint 406, along the path denoted in the Figure as a dashed line. Planned route segment 404b extends from the waypoint to destination 408. The route actually travelled by the traveler includes deviation segment 410 and planned route segment 404b. Deviation segment 410 extends from the starting point to the waypoint along the path denoted in the Figure as a dotted line.

Figure 5:
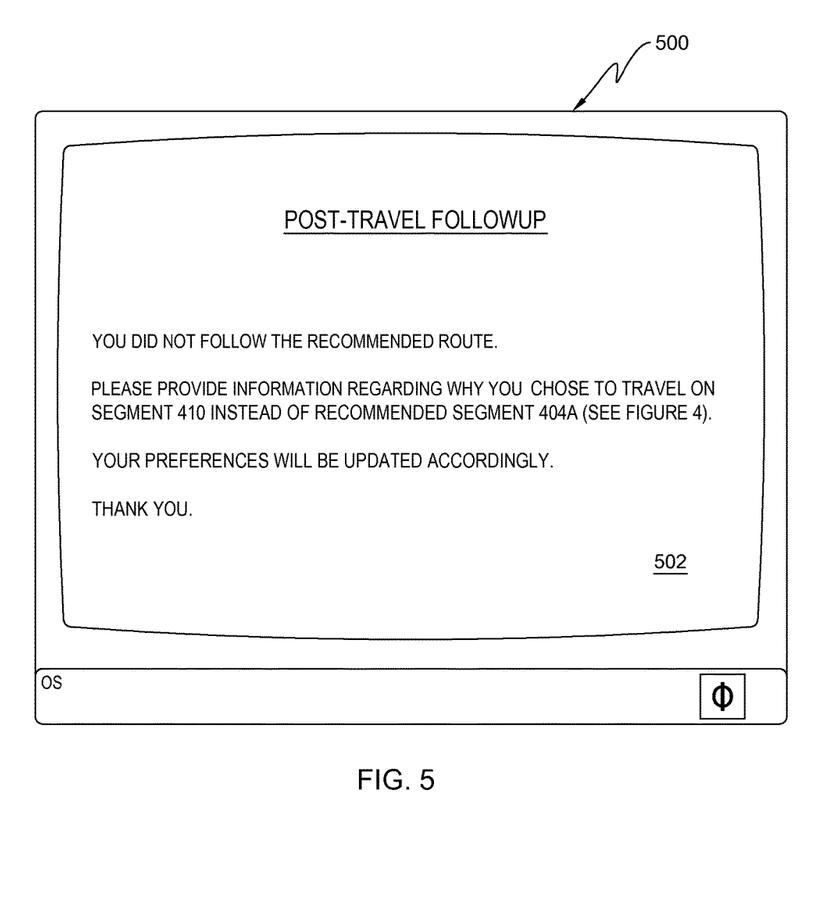
FIG. 5 is a screenshot view generated by an embodiment of the present invention.

As shown on computer display 500 of FIG. 5, screenshot view 502 shows information that is output by software according to an embodiment of the present invention, after completion of the trip represented on map 400 of FIG. 4. The software composes and sends an e-mail (or other communication) to the traveler to ask for guided commentary on why the traveler chose a route different from the route recommended by the GPS software.

Potential free-form responses include for example: (i) "I prefer segment 410 because it is more scenic and I always want to go this way unless it is snowing or has snowed within the previous four hours, in which case I want to use segment 404a"; (ii) "there was an emergency condition obstructing traffic on segment 404a and traffic was detoured onto segment 410"; and/or (iii) "segment 410 is less congested between the hours/dates of X and Y on weekdays."

All available information about the trip, including the starting and destination locations, planned route, actual route, and the user's feedback, are stored and managed on route optimizing server computer 200 (see FIG. 1), keyed according to user(s). The information, including user preferences, is stored and managed on the server and is applied whenever a complete or partial route is planned, and/or travelled.

In some embodiments, when a GPS device determines travel directions for a planned trip, it contacts route optimizing server (as discussed, above, in the Example Embodiment sub-section of this Detailed Description section) and determines whether any of the traveler's (registered user) route preferences, or other available information, can be applied to the trip. Any applicable preferences and information are applied to the route and the modified route directions are returned to the GPS. A post-travel follow-up is repeated each time the traveler deviates from the planned route directions.

In some embodiments, the post-travel follow-up approach is applied to a user scenario leveraging a GPS dashboard. The user logs into the dashboard to allow application of route preferences. After the starting and ending locations are submitted to the dashboard, algorithms calculate the "best routes." Those routes are compared with route preferences and applicable modifications are made. The updated routes are displayed to the user.

Some embodiments of the present invention incorporate semantic and natural language text parsing techniques to analyze user feedback, to better understand when or how to apply the user's preferences. With user's approval, the system incorporates logic to compare and review post-travel follow-up feedback from multiple users to promote common trip deviations into a new "best" route applicable for multiple users.

Some embodiments of the present invention allow a user to modify their established preferences after logging in to a user account. Further, embodiments of the present invention can be applied to all modes of transportation including: automobile; ship/boat; walking; bicycle; bus; rail; taxi; and/or air travel, etc.

Some embodiments of the present invention may include one, or more, of the following features, characteristics and/or advantages: (i) route deviations are determined and tracked automatically; (ii) a post-travel follow-up information of the differences (route deviations) is sent to the user for review via network (as discussed, above, in the Example Embodiment sub-section of this Detailed Description section); (iii) the user indicates their preferences by their actions of deviating from a route specified by the GPS; (iv) focuses on the ability to override a route or route segment automatically and let this override be used without regard to any scoring algorithm (in other words, a user's preferred route is easily defined and/or discovered, and then used); (v) during or after travelling a tour route, the user can add or remove locations from the tour, and the modified tour route is used on following tours or tour segments; (vi) provides for personalizing a route; (vii) deviations that a user takes (with respect to a given, generated route that could be optimal) are saved; (viii) allows multiple users to provide feedback on their preferred routes (not necessarily optimal routes); (ix) allows a first user to decide whether to apply deviations used by others to the first user's preferred routes; (x) uses a "post-travel follow-up" feedback approach where a user's personal optimal route (or "golden route") is calculated based on feedback from the user or other users' feedback; and/or (xi) the post-travel follow-up feedback approach is safer and better for the traveler who can evaluate their changes after a trip is completed and not while driving.

Some embodiments of the present invention may include one, or more, of the following features, characteristics and/or advantages: (i) personalizes travel route planning (using GPS or other technologies) based on reasons for previous routing deviations; (ii) receives user input regarding differences between an initial routing (planned route) and an actual route taken, to collect reasons for routing deviations from one or more users; (iii) analyzes the user input, including the routing deviation reasons, to form a user-tailored routing algorithm; (iv) utilizes the user tailored routing algorithm to form a user-tailored routing; and/or (v) provides the user-tailored routing algorithm by a service that allows users to register and communicate with the service via social networking communications.

One embodiment of a method according to the present disclosure includes the following operations (not necessarily in the following order): (i) receiving user input regarding deviations between an initial routing and an actual routing, to form routing deviations reasons; (ii) analyzing the user input and the routing deviation reasons to form a user-tailored routing algorithm wherein the tailored routing algorithm is provided by a service allowing users to register and communicate with the service via social networking communications; and (iii) utilizing the user-tailored routing algorithm to form a routing tailored for the user.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Positioning system: any system, including a conventional global positioning system (GPS), that is capable of detecting (within an accuracy that is meaningful with respect to a given application) the geographical position of an object over at least some range of territory (for example, global, local area); a positioning system will generally employ some type of wireless signal, but positioning systems are not limited to positioning systems that use satellites; positioning systems may use standard longitude and latitude, but other co-ordinate systems may be used (for example, a cylindrical co-ordinate system having its origin at sea level in the center of a given city).

What is claimed is:

1. A method comprising:
   receiving, by one or more processors from a global positioning system (GPS) device, GPS positioning input data corresponding to a deviation of a user from a first planned route for a first trip;
   querying, by the one or more processors, the user for a reason for the deviation;
   receiving, by the one or more processors, the reason for the deviation;
   determining, through machine logic and by the one or more processors, deviation rule time data, based, at least in part, on the reason for the deviation;
   tailoring, through machine logic and by the one or more processors, a user tailored GPS routing algorithm, based, at least in part, on the GPS positioning input data corresponding to the deviation from the first planned route, the reason for the deviation received from the user and the deviation rule time data; and
   generating, by the one or more processors, a personalized GPS route for a second trip for the user, based, at least in part, on the user tailored GPS routing algorithm and a default planned GPS route for the second trip.

2. The method of 1 wherein the user tailored GPS routing algorithm includes limitations to date and time when a deviation is applicable to the personalized GPS route.

3. The method of 1 wherein the querying the user for a reason includes displaying a list of reasons for the deviation provided by other users and querying the driver for a selection from the displayed list.

4. The method of 1 further comprising:
   displaying, by the one or more processors, the default planned GPS route, the personalized GPS route, and the reason for the deviation as a reason why the personalized GPS route is different than the default planned GPS route.

5. A computer program product comprising:
   a non-transitory machine readable storage device; and
   computer code stored on the non-transitory machine readable storage device, with the computer code including instructions for causing a processor(s) set to perform operations including the following:
   receiving, by one or more processors from a GPS device, GPS positioning input data corresponding to a deviation of a user from a first planned route for a first trip;
   querying, by the one or more processors, the user for a reason for the deviation;
   receiving, by the one or more processors, the reason for the deviation;
   determining, through machine logic and by the one or more processors, deviation rule time data, based, at least in part, on the reason for the deviation;
   tailoring, through machine logic and by the one or more processors, a user tailored GPS routing algorithm, based, at least in part, on the GPS positioning input data corresponding to the deviation from the first planned route, the reason for the deviation received from the user and the deviation rule time data; and
   generating, by the one or more processors, a personalized GPS route for a second trip for the user, based, at least in part, on the user tailored GPS routing algorithm and a default planned GPS route for the second trip.

6. The product of 5 wherein the user tailored GPS routing algorithm includes limitations to date and time when a deviation is applicable to the personalized GPS route.

7. The product of 5 wherein the querying the user for a reason includes displaying a list of reasons for the deviation provided by other users and querying the driver for a selection from the displayed list.

8. The product of 5 further comprising:
   displaying, by the one or more processors, the default planned GPS route, the personalized GPS route, and the reason for the deviation as a reason why the personalized GPS route is different than the default planned GPS route.

9. A computer system comprising:
   a processor(s) set;
   a machine readable storage device; and
   computer code stored on the machine readable storage device, with the computer code including instructions for causing the processor(s) set to perform operations including the following:
   receiving, by one or more processors from a GPS device, GPS positioning input data corresponding to a deviation of a user from a first planned route for a first trip;
   querying, by the one or more processors, the user for a reason for the deviation;
   receiving, by the one or more processors, the reason for the deviation;
   determining, through machine logic and by the one or more processors, deviation rule time data, based, at least in part, on the reason for the deviation;
   tailoring, through machine logic and by the one or more processors, a user tailored GPS routing algorithm, based, at least in part, on the GPS positioning input data corresponding to the deviation from the first planned route, the reason for the deviation received from the user and the deviation rule time data; and generating, by the one or more processors, a personalized GPS route for a second trip for the user, based, at least in part, on the user tailored GPS routing algorithm and a default planned GPS route for the second trip.

10. The system of 9 wherein the user tailored GPS routing algorithm includes limitations to date and time when a deviation is applicable to the personalized GPS route.

11. The system of 9 wherein the querying the user for a reason includes displaying a list of reasons for the deviation provided by other users and querying the driver for a selection from the displayed list.

12. The system of 9 further comprising:

displaying, by the one or more processors, the default planned GPS route, the personalized GPS route, and the reason for the deviation as a reason why the personalized GPS route is different than the default planned GPS route.

\* \* \* \* \*